United States Patent
Zhmudyak

(10) Patent No.: US 10,247,091 B2
(45) Date of Patent: Apr. 2, 2019

(54) METHOD OF GAS DISTRIBUTION OF INTERNAL COMBUSTION ENGINE

(71) Applicant: Alexandra Leonidovna Zhmudyak, Rehovot (IL)

(72) Inventor: Alexandra Leonidovna Zhmudyak, Rehovot (IL)

( * ) Notice: Subject to any disclaimer, the term of this patent is extended or adjusted under 35 U.S.C. 154(b) by 0 days.

(21) Appl. No.: 13/684,169

(22) Filed: Nov. 22, 2012

(65) Prior Publication Data

US 2014/0150740 A1 Jun. 5, 2014

(51) Int. Cl.
| | | |
|---|---|---|
| F02B 25/00 | (2006.01) | |
| F02B 47/08 | (2006.01) | |
| F01B 17/02 | (2006.01) | |
| F02B 25/04 | (2006.01) | |

(52) U.S. Cl.
CPC .............. *F02B 47/08* (2013.01); *F01B 17/02* (2013.01); *F02B 25/04* (2013.01); *Y02T 10/121* (2013.01)

(58) Field of Classification Search
CPC ................................. F02B 25/04; F02B 37/18
USPC ...... 123/65 VP, 65 VB, 21, 317, 65 A, 65 R; 60/605.2
See application file for complete search history.

(56) References Cited

U.S. PATENT DOCUMENTS

| | | | | |
|---|---|---|---|---|
| 2,594,845 A * | 4/1952 | Baumann | .................. | 60/609 |
| 4,426,967 A * | 1/1984 | McWhorter | ............ | F02B 33/44 123/315 |
| 5,027,757 A * | 7/1991 | Pusic | ................... | 123/65 A |
| 5,113,805 A * | 5/1992 | Kawamura | ............. | F02B 69/06 123/188.5 |
| 5,345,897 A * | 9/1994 | Linder | ................... | F01L 1/446 123/65 A |
| 6,101,989 A * | 8/2000 | Green | ................. | F02B 23/0672 123/568.14 |
| 6,145,488 A * | 11/2000 | Plechner | ................. | F02B 25/14 123/193.1 |
| 6,378,308 B1 * | 4/2002 | Pfluger | ................. | F01N 13/107 123/559.1 |
| 6,637,385 B2 * | 10/2003 | Muraji | ...................... | F01L 9/04 123/315 |
| 8,573,178 B2 * | 11/2013 | Cleeves | ..................... | F01L 5/06 123/188.5 |
| 8,746,190 B2 * | 6/2014 | Lemke | ...................... | F01B 7/14 123/323 |
| 2009/0173071 A1* | 7/2009 | Kapich | ............... | F02B 29/0425 60/605.2 |
| 2012/0210985 A1* | 8/2012 | Fuqua | ....................... | F01L 1/38 123/51 B |

* cited by examiner

*Primary Examiner* — Marguerite McMahon
*Assistant Examiner* — James Kim

(57) ABSTRACT

An air, entering into the cylinder of the piston internal combustion engine (PICE) via intake valve (or coming both: through intake valve and through intake ports in the sleeve), flows out through the exhaust ports in the sleeve at the end of the intake stroke and/or at the beginning of the compression stroke. Thus increase (compared with the conventional—"PICE") scavenging through the cylinder at full engine loads.

In idle running, at low loads and in starting the backflow of exhaust gases into the cylinder is performed. Due to this, the starting is better.

7 Claims, 5 Drawing Sheets

METHOD OF GAS DISTRIBUTION OF INTERNAL COMBUSTION ENGINE

FIELD OF THE INVENTION

The invention relates to a four-stroke piston internal combustion engines (PICE), which has the induction system and exhaust system and the intake and exhaust valves. Concretely, the invention relates to methods for gas distribution in these engines, to methods of gas distribution including opening the intake valve during the intake stroke and the opening of the exhaust valve during the power and exhaust stroke.

BACKGROUND OF THE INVENTION

Closest to the invention (the prototype of the invention) is a classic method of gas exchange of four-stroke internal combustion engine. This method comprises opening of the intake valve on the intake stroke and opening of the exhaust valve on the power stroke and exhaust stroke and is implemented in most PICE with the induction system and the exhaust system, including the PICE with the induction system having a device for air charging, in other words— device (or devices) for air compression, for example, compressor of turbocharger, and with the exhaust system having the device (or devices) of the combustion products expansion, for example, turbine of the turbocharger.

A well-known negative attribute of the classical method of gas distribution is relatively small flow area of intake and exhaust valves. Small flow area of the valves limits the quality and speed of gas exchange, therefore, reduces the performance of the engine and limits engine uprating. Method of gas distribution through sleeve valve [Ricardo, Sir Harry R.; Hempson, J G G (1968). *The High-Speed Internal-Combustion Engine* (Fifth ed.). London and Glasgow: Blackie & Son. pp. 290-322.] is used ports in the cylinder sleeve. Mentioned ports in the sleeve have a bigger flow area than the valves. But method of gas distribution through sleeve valve (which is a method-analog) is complicated, so was uncompetitive compared to the method of gas distribution through the valves. Disadvantage of the prototype, as well as of the method-analog, is the small scavenging. Small scavenging not cool details of exhaust system and they (correspondingly, the exhaust valve and moving sleeve) have big heat stress.

Insufficient scavenging leads to the high thermal stress and high temperature not only of details of exhaust system, but of the cylinder head, piston and other engine details, as well as leads to an incomplete cleaning of the cylinder from the combustion products.

In the method—analog there are the heat and mechanical stresses in the sleeve ports, more precisely, in the edges of the ports and ports-related mechanisms. This stress associated with the fact that the ports: a) are located at the top of the cylinder, where the gas has a high temperature and pressure, and b) open only at the end of the gas expansion and exhaust, and through the ports the hot products of combustion outflows; scavenging is very small or absent.

On the high frequency rotation and/or high loads, when there is excess pressure ratio in the compressor of turbocharger, insufficient scavenging leads to too much value of the maximum combustion pressure.

Besides, methods of gas distribution: the method-prototype and the method-analog do not allow supply a portion of an engine's hot exhaust gas back to the engine cylinder at the last stage of the intake stroke. Said hot exhaust gas back to the cylinder is useful at start-up, idling and low loads.

Relatively cold air (cold fresh charge) at the last stage of the intake stroke and first stage of the compression stroke reduce starting characteristics, a little reduce efficiency and ecological characteristics at starting, idling and low loads when the method-prototype and the method-analog is used.

BRIEF DESCRIPTION OF THE DRAWINGS

FIG. 1 shows the exhaust (outflow of gases from the cylinder) through both: the ports and the exhaust valve when the piston is at the bottom dead center of the power stroke.

FIG. 2 shows the intake and air flowing (scavenging), when the piston is at the bottom dead center of the intake stroke of the engine, in which the pressure after the compressor of the turbocharger (TC) higher that the pressure in front of the turbine of TC.

FIG. 3 illustrates the realization of gases distribution according to the proposed method at start, idle and low loads; in the figure the piston is in BDC of the intake stroke, when the pressure in the exhaust pipe above the pressure in the cylinder and a part of hot exhaust gases returns through the ports into the cylinder. Direction of the backflow of the exhaust gases is shown by arrow.

DETAILED DESCRIPTION OF THE INVENTION

In modern turbocharged engines, at the high loads or at high loads and high engine speed, boost pressure and after intercooler pressure is higher than pressure in front of the turbine of turbocharger. In this PICE, at the high loads or at high loads and high engine speed, near BDC (bottom dead center) of intake stroke, pressure in the cylinder is higher that pressure in the exhaust manifold (that the pressure after the exhaust valve at the considerable moment).

In order to decrease this excess pressure in the cylinder, a part of the exhaust gases is bypassed around the turbine of turbocharger at said operation regimes.

At low loads, in idle running and in starting there is an opposite situation: the pressure in the exhaust manifold is higher that the cylinder pressure at the last stage of the intake stroke near BDC.

Not exclusively, but preferably the offered method of gas distribution was created for mentioned engines. This method is used in engines with driven charging (with mechanical moving compressor) too.

Figure 1:
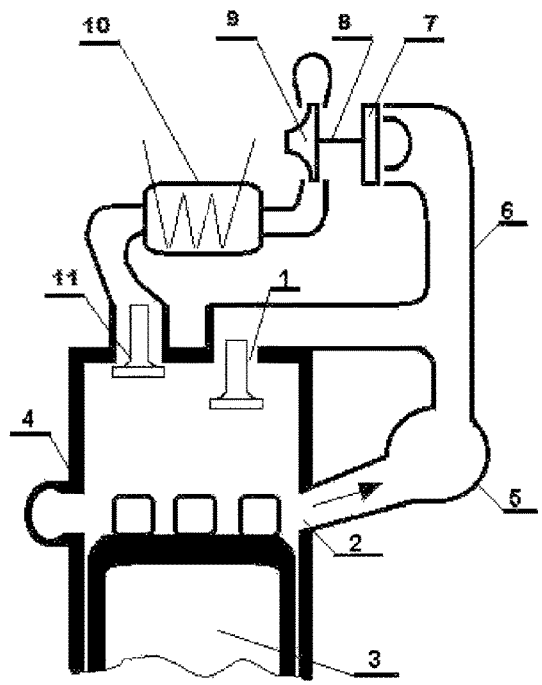
FIGS. 1-3 illustrate the simplest variant of the proposed method of gas distribution of four-stroke internal combustion engine.

The simplest and the best variant of the offered method of gas distribution of internal combustion engine is created for four-stroke engine and comprising piston-controlled ports in the cylinder sleeve: ports are uncovering as piston moves down to the bottom of piston stroke and covering as piston moves up from the bottom of piston stroke, valves on the ports are not installed—see FIG. 1, where is constantly open ports.

According to offered method at the last stage of the power stroke (and at the last stage of expansion process) the exhaust valve 1 (FIG. 1) is opened like at the well-known classic method of gas exchange of four-stroke PICE (prototype).

Ports 2 in the sleeve are uncovering as piston 3 moves down in the cylinder 4 to the bottom of piston stroke on intake stroke. Thus, the ports in the sleeve connect to the pipe 5, which is connected to exhaust manifold 6; that realizes the outflow of exhaust gas to the exhaust manifold.

The exhaust via both: exhaust valve 1 and ports 2, i.e. split the outflow of hot exhaust gases, reduces temperature and the heat stress of the cylinder head and exhaust valve 1, so opens the possibility of additional boost of the engine. Reducing the temperature reduces the tendency to knock, allowing additional engine boosting, in particular, by increasing boost pressure.

Use of the ports increases the flow area of the exhaust gases outflow and allows: to reduce the power waste when pushing out the exhaust gases, what increases efficiency; to exercise exhaust at high frequencies of rotation of the crankshaft, i.e. increase the engine speed and proportionally—the engine power.

The exhaust gases flow out through both valve 1 and port 2 continues in the beginning of the exhaust stroke (when the piston moves from BDC) until the piston covers the ports 2. Then, in the exhaust process, the piston is moving towards top dead center (TDC) and continues to push exhaust gases through the exhaust valve 1.

Figure 2:
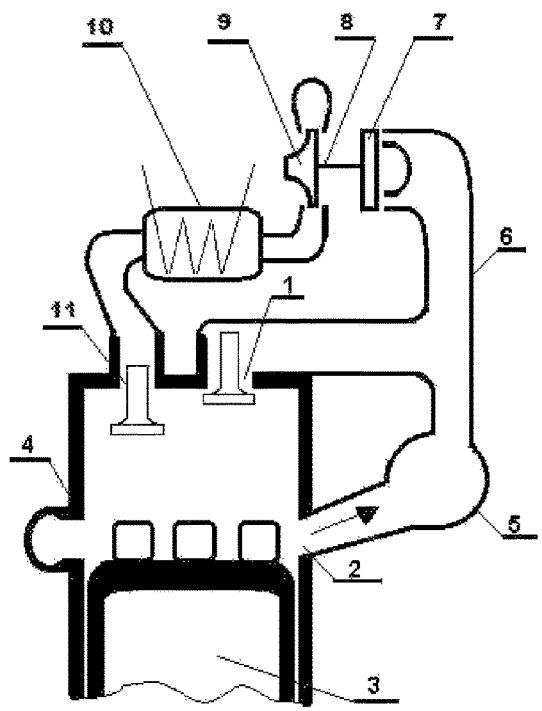

Exhaust gas flows from the manifold 6 to the turbine 7 of the turbocharger 8. The air, compressed in the compressor 9 of the turbocharger and cooled in the intercooler 10, is supplied into the cylinder 4 through the intake valve 11 during the admission process. At the end of the intake stroke (and of the process of admission) piston 3 appears again in the BDC (FIG. 2). When the piston approach to the BDC, ports 2 is reopening, thus ports again connected to the pipe 5 and through it with the exhaust manifold 6. At high loads and regimes, especially, full loads and high engine speed in this engine pressure in the cylinder 4 at the end of the intake stroke higher than the pressure in the exhaust manifold 6. Therefore, air flows away from the cylinder through ports 2 and pipe 5 to manifold 6 and then to the turbine. This way the cylinder air discharges through the ports in the sleeve at the end of the intake stroke and at the beginning of compression stroke.

I. e. there is the high scavenging through the cylinder, thereby temperature and heat stress of the cylinder, piston, turbines, the other details decrease.

At the high loads and at the high loads and high engine speed, high scavenging reduces quantity of air in the cylinder from excess to acceptable values, i.e. reduced to acceptable level the maximum combustion pressure and risk of a detonation. It is important to note that the decrease: the mass of air supplied to the cylinder, the maximum combustion pressure and the risk of detonation are carried out without the exhaust gases bypass around the turbine.

At low loads (as well as at the partial regimes, for example, when the engine speed decreases), at idle running and at starting the pressure in the cylinder at the last stage of the intake stroke is lower than the pressure in the exhaust manifold. Therefore, near the BDC of intake stroke the flowing out does not occur, there is returning of the exhaust gases into the cylinder (backflow) through the ports in the sleeve. This flow of exhaust gases is shown by the arrow on FIG. 3.

The method described above is the best variant because of the simplicity and absence of additional moving details in the mechanism of gas distribution. That means absence of the moving details, additional compared to the mechanism of gas distribution of the classical four-stroke PICE.

In addition to the above-stated method, there are other variants which are described below.

In the variant of the method part of the ports in the sleeve is connected to the intake manifold, and the other part—with the exhaust. The connection with the intake manifold is realized through the valve opening on the intake stroke in the direction of air flow in the cylinder.

Figure 4:
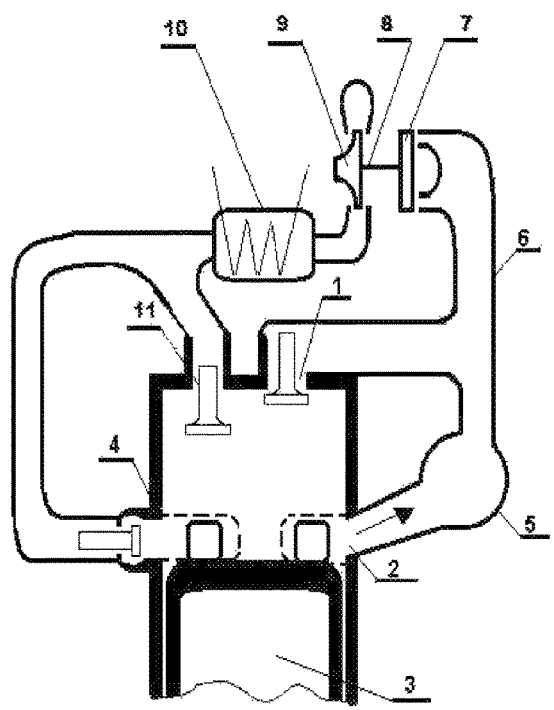
FIG. 4 shows the scheme of a variant of the proposed method; a part of the ports are used for exhaust and air flow (scavenging) and part of ports are used for an intake.

This variant of the method is illustrated in FIG. 4.

In considered above, the best variant of the offered engine, exhaust gases from the exhaust valve and exhaust gases out of the ports in the sleeve are directed to the same device of expansion, specifically,—to the turbine of turbocharger.

In the variant of the method a collection of devices (or device) for exhaust gases expansions in which expand the exhaust gases, coming out of the exhaust valve, and a collection of devices in which expand the exhaust gases, coming out of the ports in a sleeve, differ for at least by one device or at least one sequence of connection. In the given variants the exhaust to the atmosphere through the exhaust valve or the ports in the sleeve can be released. Exhaust to the atmosphere is included in the above set collection of devices, if the connection with the atmosphere is set as device of expansion with zero expansion.

Figure 5:
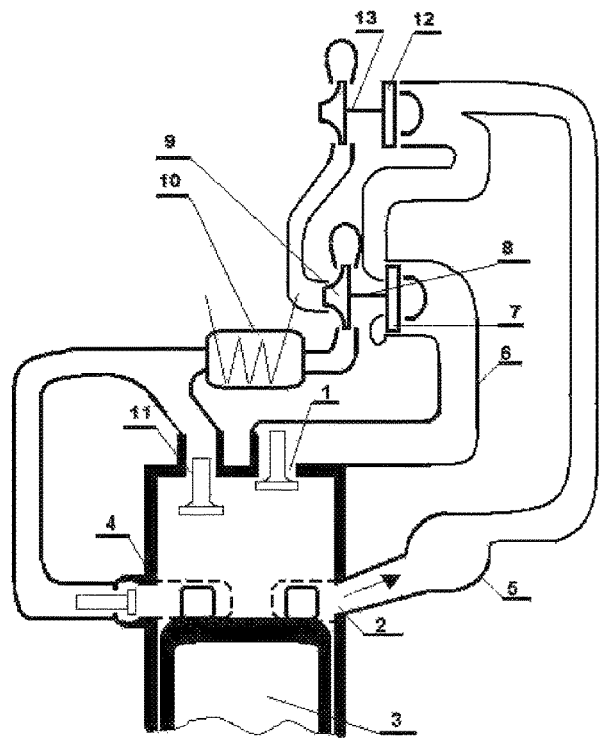
In FIG. 5 it is given an example of embodiment of variant of the method of gas distribution, where the exhaust gases, flow out through the exhaust valve, is expanded in two turbines of sequentially working turbochargers (two stages turbocharging), and exhaust gases, flowing out of the ports in the sleeve, and air, flowing through the cylinder, are expanded in one, the first, stage of turbocharging—in the turbine of turbocharger, which is connected to the atmosphere.

An example of variant of the method including the expansion of the exhaust gases, which flows out through the valve and which flows out through the ports, not in the same devices,—illustrated in FIG. 5. FIG. 5 explains realization of the variant of the method in PICE with two-stage turbocharger. Exhaust valve 1 is connected to the turbine of the second stage of turbocharger (to the turbine 7 of turbocharger 8), that realizes expansion of exhaust gases flowing out through the exhaust valve.

Ports 2 in the sleeve is connected to the turbine 12 of the turbocharger 13 of the first stage of boost; that is bypassing exhaust gases around the turbine 7 of turbocharger of the second stage of boost.

Such method of gas distribution provides intensive scavenging during the intake stroke because the scavenging is carried out under high pressure differences.

Pressure after the compressor 9 of the second stage of turbocharging (note, that in the intake stroke and during the intake process air to the cylinder comes under such pressure) is much higher, than the pressure in front of the turbine 12 of the first stage of turbocharging, and, means, much higher than the pressure after the ports 2 in which air flows out from the cylinder.

Special case of this method is that the turbocharger 13 absents and the ports are connected through the exhaust pipe to the atmosphere.

In the method's variant with alternative connection of the turbochargers (this variant is not shown in the figures) the exhaust valve 1 is connected to the turbine 12 of the first stage of turbocharger, and ports 2 are connected to the turbine 7 of the second stage of turbocharger. The exhaust gases which have expended in the turbine 7, direct from the turbine 7 to the turbine 12, as well as in the previous method.

In this variant scavenging is worse, than in the previous, but work of pushing out of gases is less at the piston stroke from BDC to TDC of the exhaust stroke.

In the next variant of the method, the exhaust valve and the ports in the sleeve are connected to the parallel operating turbines 7 and 12, i.e. exhaust gases which have expanded in each of these turbines, is directed through the exhaust pipe into the atmosphere. In other words, the exhaust gases from the second-stage turbocharging—from the turbine 7 of turbocharger 8—directed not to the turbine 12, but in the exhaust pipe.

Figure 6:
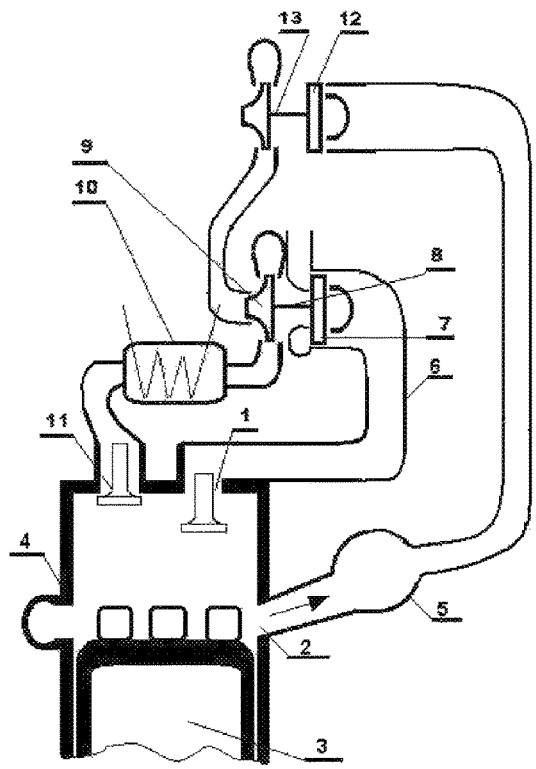
In FIG. 6 it is given an example of embodiment of variant of the method of gas distribution, where the exhaust gases, flow out through the exhaust valve, is expanded in the turbine of one turbocharger, and exhaust gases, flowing out of the ports in the sleeve, and air, flowing through the cylinder, are expanded in the other, separate, parallel, turbine, of the other turbocharger.

Parallel operation of turbines can be combined with the methods of connection described in the previous variants: the exhaust valve 1—to the turbine 7 and ports 2—to the turbine 12. Such variant is shown in FIG. 6. But it is possible an alternative connection also:—ports 2—to the turbine 7 and the exhaust valve 1—to the turbine 12.

In further variants of the method, improving the engine performance is achieved by alternately connecting the ports in the sleeve with two sections of the exhaust system, which (sections) have a different pressure; when opening the ports in the power and exhaust strokes, said ports connect to the section the higher pressure, and when opening the ports in the intake and compression strokes, said ports connect with the section of lower pressure.

Concretely, in variants of the method the ports are connected: in the power stroke and exhaust stroke—with the section of the exhaust system in front of the device (in front of devices) of expansion of the exhaust gases, and in the intake and compression strokes—with the section of the exhaust system after at least one device of exhaust gases expansion.

Switching in the function of strokes of engine cycle (so to say, by stroke—switching) provides a good scavenging, thus decrease heat stress and temperature of the cylinder head, cylinder, valves, piston group in the PICE. And the intensity scavenging is achieved even in the engine, in which the pressure in the exhaust manifold is higher, than in the intake manifold. To the above mentioned PICE belongs, in particular, diesel engines with power turbine, installed in front of or after turbocharger.

Let's consider operation, using the proposed method, of diesel engine with turbocharging and the power turbine, installed after the turbine of turbocharger.

Figure 7:
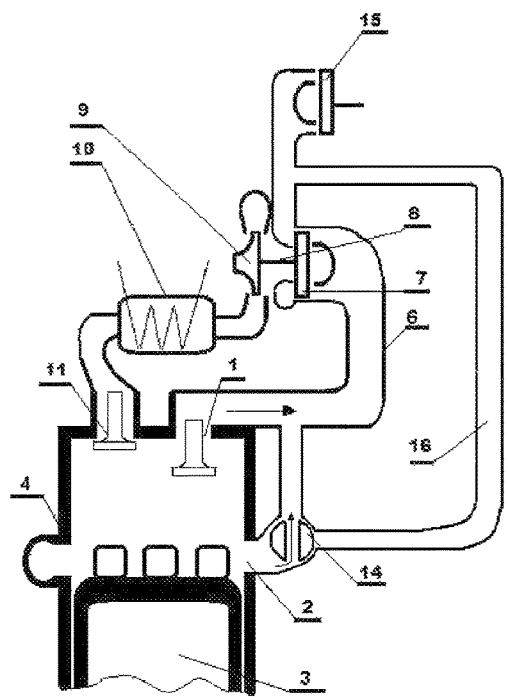
FIGS. 7-10 show examples of the embodiment of the variants of the method of gas distribution at which the exhaust gases flow out of the ports in the cylinder sleeve are switched in the function of the engine's strokes.

Exhaust in this PICE when the piston is at BDC of power stroke is shown in FIG. 7. At the end of the power stroke, as well as in the methods considered above, the exhaust valve 1 is opened. Ports 2 in the sleeve open by the piston 3 when the last moves to BDC. The rotating sleeve valve 14 is set in position at which it joins the ports and the sections of the exhaust system where the pressure is higher, specifically, to the entrance of the turbine 7 of the turbocharger 8.

At such position of the mechanism of the gas distribution exhaust gases from the cylinder 4 through the valve 1 and ports 2 flow out in the exhaust manifold 6. Direction of flow of the exhaust gases is shown by arrows. Exhaust through the ports 2 continues at the beginning of the exhaust stroke.

Further in the exhaust stroke the piston moves to TDC and continues to push the exhaust gases through the exhaust valve 1.

Exhaust gases from the manifold 6 enter in the turbine 7 of the turbocharger 8 and then in the power turbine 15. Air compressed in the compressor 9 of the turbocharger 8 is supplied to the cylinder 4 during the intake stroke through intake valve 11.

Figure 8:
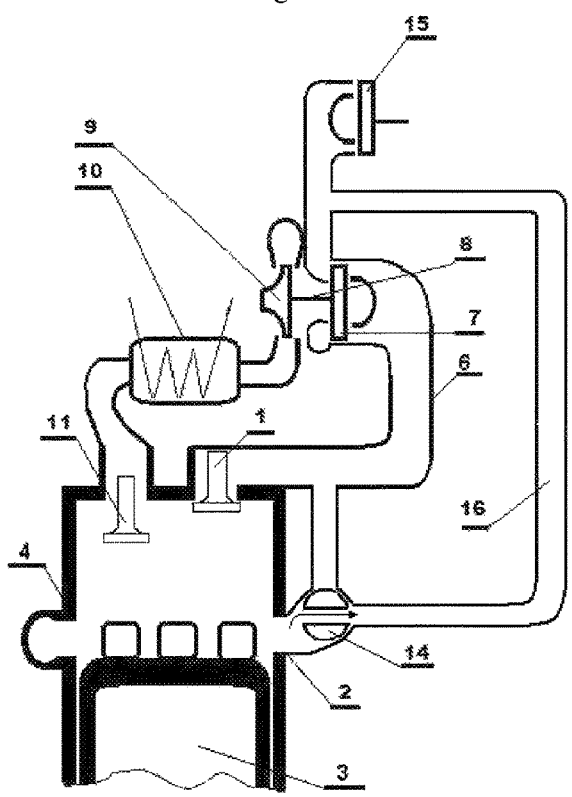

At the end of the intake stroke and at the beginning of the compression stroke (when the piston is close to BDC of the intake stroke)—FIG. 8, at the considers full loads, the rotating sleeve valve 14 connects ports 2 through the pipe 16 to the sections of the exhaust system, where the pressure is lower,—after the device for expansion of exhaust gases, in this example,—after the turbine 7.

A turn of the rotating sleeve valve is synchronized with camshaft rotation: camshaft turn on 180 degrees (when turning the crankshaft on 360°) corresponds to the rotating sleeve valve turn on 90 degrees.

At full load pressure in the pipe 16 is less than in the exhaust manifold 6, and it is less, than in the cylinder 4 during the period when the piston close to BDC of intake stroke. Therefore, the air from the cylinder flows out in the pipe 16. This scavenging through the cylinder reduced thermal stress of the cylinder head, cylinder, valves, piston group and other details. In addition, air outflow reduces $p_{max}$—the maximum combustion pressure. Note, that the scavenging is carried out even at very high pressure in the exhaust manifold 6, in particular, the scavenging is carried out in the engine with the power turbine, in which the pressure in the exhaust manifold 6 is higher than the pressure in front of the intake valve 11.

In variants of embodiments of the method the air, flowing out the cylinder during the intake and compression processes through the ports into the pipe 16, can be directed not to the power turbine, and, in general, not to an expansion device. The air can be directed in the atmosphere, and also can be used for air blowing of hot details, for drive of a turbofan, that drives (or the pumping sucked) air through the boost air cooler (intercooler) or via intercooler and radiators of a cooling system.

Figure 9:
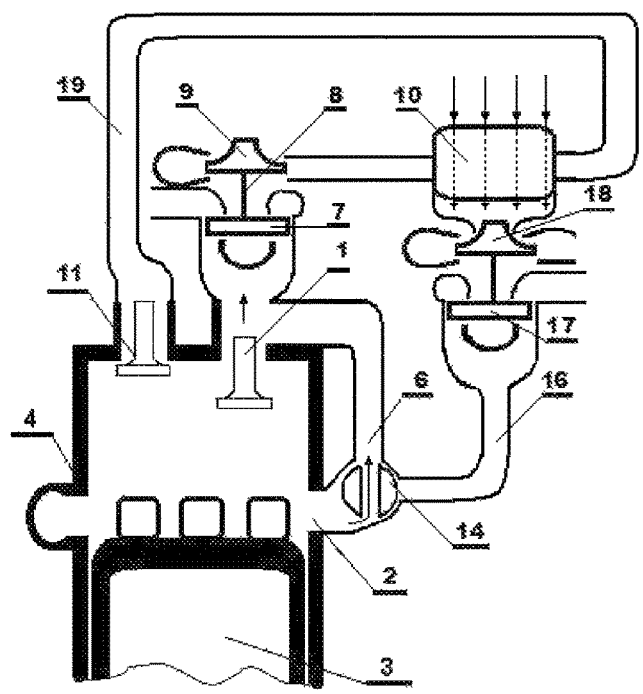
Figure 10:
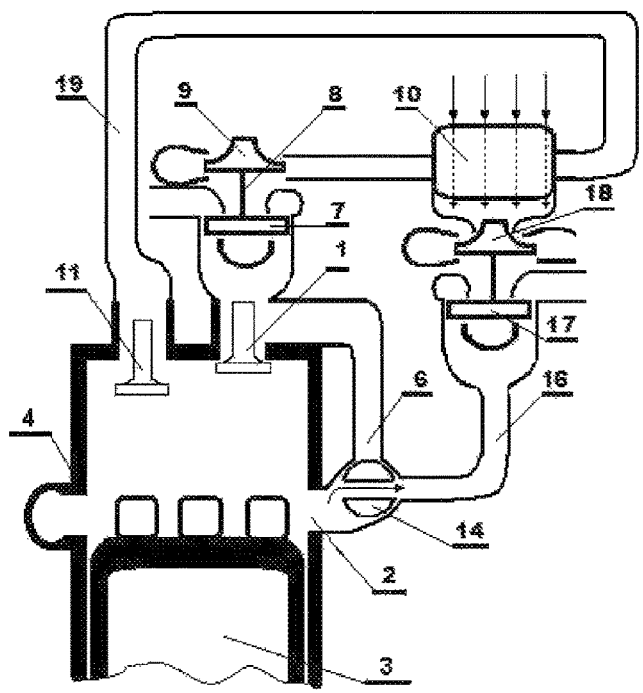

Use of energy of air, which was flowed through the cylinder, for soakage of cooling air (another air) through intercooler is illustrated in FIGS. 9 and 10.

According to the proposed method at the end of the power stroke (FIG. 9), as well as in the previous variants of the method, the exhaust valve 1 opens, ports 2 in the sleeve are opened by piston 3, when the last moving to BDC of power stroke. The rotating sleeve valve 14, as is shown in FIG. 9, set in position where it joins ports and the exhaust manifold 6. Thus, is realized exhaust from the cylinder 4 through the exhaust valve 1 and ports 2; exhaust gases flow to the manifold 6 and, further, in the turbine 7 of the turbocharger 8. The turbine 7 rotates the compressor 9 of the turbocharger 8 which forces air through the intercooler 10 and (see FIG. 10) the intake valve 11 into the cylinder 4 of the engine. FIG. 10 illustrates the end of the intake stroke and beginning of the compression stroke when the piston is at BDC of intake stroke. At the end of the intake stroke the piston, moving to BDC, re-opens the ports 2. The rotating sleeve valve 14 is set in a position where ports 2 through the pipe 16 are connected with the turbine 17.

At full loads and high engine speeds, generated by the compressor 9 boost pressure in the intake manifold and pressure in the cylinder 4, during the intake stroke,—higher than the pressure in front of the turbine 17 of turbofan. Therefore, near the BDC of the intake stroke (FIG. 10) air, which flowing out of the cylinder, flows into the turbine 17. The last rotates the fan 18, which sucked air through the intercooler 10.

In a variant of the method turbine 17 also can rotate the fan of cooling system of the engine.

Other ways of use air, which flowing out of the cylinder, for engine cooling are possible also.

The air, which flowing out of the cylinder, can be a motive fluid in an injector, which uses in injection cooling system for engine and/or intercooler. It is possible to cool said air in the heat exchanger (in particular, to cool using outboard water at ship engines), to expand this air and submit it to blow hot details or intercooler, etc.

In any case, when using the air, which flows through the cylinder, for cooling, useful self-regulation takes place: when the engine power increases, increases quantity and energy of the air, which flows through the cylinder, thus increasing cooling.

In FIGS. 7-10 the rotating sleeve valve 14 is shown schematically. For distribution of gas flows it is possible to use known devices of slide valve type. Among such devices it is possible to use rotary valves or sleeve-type valves (see ported sleeves, Willy-Knight sleeve valve engine, etc).

For use of energy of the air, which flows through the cylinder and ports 2, in the variant of the offered method (in particular, in the variant of considered above method with the stroke-switching rotating sleeve valve) it is possible to return this air into the intake system. At a two-stage air compression sequentially in two compressors, mentioned returning of the air is realized, for example, so. Air, which flows through the cylinder and ports 2 (and from this ports in the pipe 16, as in FIG. 10), is cooled in a separate cooler of the air; from the cooler air is directed to the pipe that connecting the compressors of the first and second stage.

In PICE, to reduce the toxicity, use exhaust gas recycling. In the proposed method for the recycling can be used ports 2. Supply of a part of exhaust gases into the cylinder during the intake stroke and compression stroke can be carried out: by a special profiling of the rotating sleeve valve 14, by a manufacturing of clearances between the rotating sleeve valve and the exhaust manifold 6, by setting valve timing of connection ports and the pipes of the exhaust system.

Figure 3:
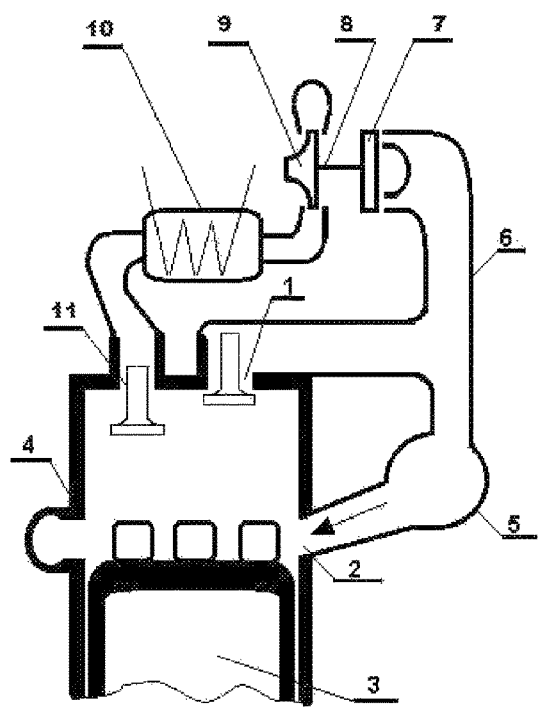

The description of the variants of the method considered above relates to full loads. At low loads or/and low engine speed and at start the rotating sleeve valve 14 is stopped in position (FIG. 7, FIG. 9), at which it at all strokes of the cycle connects ports 2 via the exhaust manifold 6 with the section of the exhaust system, where the pressure is higher. Concretely, at low loads or/and low engine speed and at start the rotating sleeve valve 14, as in FIGS. 7 and 9, is connected ports 2 with the exhaust system's section in front of devices of exhaust gases expansion,—in FIGS. 7 and 9—with the section in front of the turbine 7. Thus, at the end of expansion (at the end of power stroke) and at the beginning of exhaust stroke exhaust gases, as well as at full loads, flow into the manifold 6. At the end of the intake stroke and at the beginning of the compression stroke the exhaust gases from manifold 6 flows back into the cylinder (gases backflow, as shown in FIG. 3). This increases the pressure and temperature in the cylinder that improves starting and increases efficiency. In diesel's exhaust gases there is a lot of air, so the recycling (exhaust gases backflow) increases the mass of air. As a result of recycling of exhaust gases the amount of nitrogen oxides also is reduced, i.e. the toxicity of exhaust gases is decreased.

Embodiment of changing of operating regime of the rotating sleeve valve can be executed by many ways. For example, it is possible to execute the rotating sleeve valve consisting of two sections. Sections disposed one after the other on coaxial shafts, and the 2nd section rotates and carries out gas distribution according to cycle strokes, 1st section is not rotating and only can carries out a connection of the manifold 6 and the turbine 7. The sections have an axial movement and, according to the method, are moved in the axial direction by a follow way. At low loads or/and low engine speed and at start ports are connected with the 1st section of the rotating sleeve valve, at full loads the ports are connected with the 2nd section.

At high loads and engine speeds, including nominal and its related regimes of engine operation, to increase the scavenging proposed method includes setting a later angle of the intake valve closing. Scavenging increasing leads to the reduction temperatures: cylinder head, valves and other details—and as a result to reduce the risk of detonation, thermal stress and, also, to other positive effects.

For reducing a mass flow rate of the exhaust gases flows out through the exhaust valve, according to the offered method, gas exchange through the ports combine with later (compared with the typical for traditional PICE) exhaust beginning (later opening of the exhaust valve). The reduction of mass flow rate of the exhaust gases, flows out through the exhaust valve, reduce temperatures: exhaust valve, cylinder head and other details, that reduces the risk of detonation and leads to other positive effects.

In variants of the method, size of the ports in the sleeve regulates as function of the load and engine speed. For adjusting the size of the ports it is possible to use a butterfly valve, sleeve valve or other devices.

Using such devices reduce the size of the ports and thus reduces the scavenging at partial loads or/and partial engine speed.

What is claimed is:

1. A method of gas distribution in a conventional four-stroke internal combustion engine comprising:
    (a) compressing air prior to its entering into a cylinder of the engine utilizing an external air compressor;
    (b) intaking of compressed air, on the intake stroke, via an intake valve as a piston goes down from top dead center (TDC) towards bottom dead center (BDC);
    (c) connecting open ports in the cylinder sleeve to an exhaust manifold at the end of the intake stroke and at the beginning of the compression stroke;
    (d) compressing pre-compressed air, that came from the external air compressor in the cylinder, during the compression stroke with the intake valve closed;
    (e) combusting fuel in a combustion chamber, expanding combustion products on the power stroke, exhausting some of combustion products at the end of the power stroke via both: the ports once the piston passes the ports and an exhaust valve;
    (f) exhausting combustion products on exhaust stroke via both: the open ports connected to the exhaust manifold, while the piston is still close to BDC, and the exhaust valve.

2. The method according to claim 1, wherein some of the ports in the cylinder sleeve are connected to an intake manifold at the end of the intake stroke and at the beginning of the compression stroke, while the other ports are connected to the exhaust manifold; the connection to the intake manifold is carried out through a valve, opening in the direction: "into the cylinder".

3. The method according to claim 1, wherein exhaust gases exhausting through the exhaust valve and the exhaust gases exhausting through the ports in the cylinder sleeve are directed into a turbine.

4. The method according to claim 1, wherein gases, which flow out of the exhaust valve, flow through a turbine or a sequence of turbines, while gases, which flow out of the ports in the sleeve, flow through another turbine or other sequence of turbines.

5. The method according to claim 1, wherein the gases flowing out of the ports in the sleeve rotate a turbofan, which cools intercooler or radiator of the engine.

6. The method according to claim 1, comprising connecting open ports in the cylinder sleeve:
   (a) at the end of the power stroke and at the beginning of the exhaust stroke, to a section of the exhaust manifold, which is located before the turbine or the turbines;
   (b) at the end of the intake stroke and at the beginning of the compression stroke, to the atmosphere or to a section of the exhaust manifold, which is located behind at least one turbine.

7. The method according to claim 6, wherein the method is carried out at full load, while at low loads, in idle running, and at start-up the ports are connected only (during the four strokes) to the section of the exhaust manifold, which is located before the turbine or the turbines.

\* \* \* \* \*